United States Patent [19]

Deplante et al.

[11] 4,143,308
[45] Mar. 6, 1979

[54] CONTROL FOR VARIABLE RELUCTANCE MOTORS

[75] Inventors: Michel Deplante, Paris; Didier Minesi, Fargeau-Ponthierry, both of France

[73] Assignee: Engins Matra, Paris, France

[21] Appl. No.: 797,364

[22] Filed: May 16, 1977

[30] Foreign Application Priority Data

May 19, 1976 [FR] France ............................... 76 151280

[51] Int. Cl.² ............................................ H02K 29/00
[52] U.S. Cl. .................................... 318/138; 318/701; 318/254
[58] Field of Search ................ 318/138, 166, 254, 696

[56] References Cited

U.S. PATENT DOCUMENTS

| | | | |
|---|---|---|---|
| 3,307,091 | 2/1967 | Johannes | 318/138 |
| 3,440,506 | 4/1969 | Krestel et al. | 318/138 |
| 3,584,273 | 6/1971 | Massar et al. | 318/138 |
| 3,740,630 | 6/1973 | Jarret et al. | 318/138 |
| 3,769,555 | 10/1973 | Dolbachian et al. | 318/138 |

*Primary Examiner*—Gene Z. Rubinson
*Attorney, Agent, or Firm*—Kinzer, Plyer, Dorn & McEachran

[57] ABSTRACT

A control for a variable reluctance motor, comprising a d.c. source, a power control circuit, and a command circuit, in which the power control circuit comprises main control switches in series with the windings of the motor to form terminal branches, the terminal branches being connected in groups of two in series between the two poles of the source in such a way that two complementary windings are never in series, as well as freewheel branches to close the circuit of each winding when at most one main control switch in a branch is conducting, and a turn-off circuit for the main control switches, and including at least one current detector to register the current in the windings; each free-wheel branch includes a coil and a diode, the diode polarized to oppose normal current flow through its associated main control switch.

9 Claims, 4 Drawing Figures

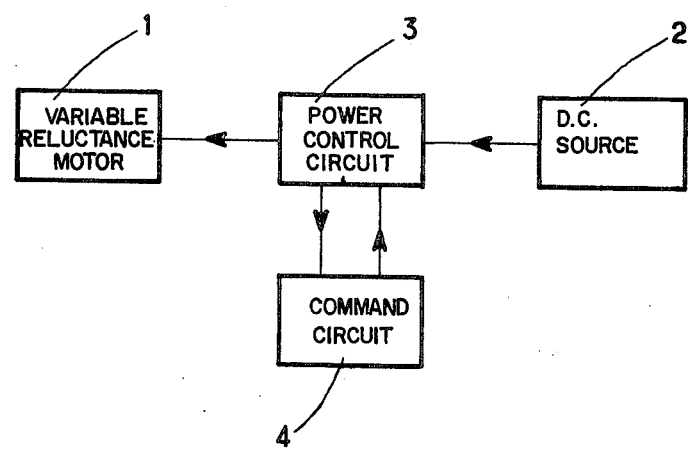
Figure: 1
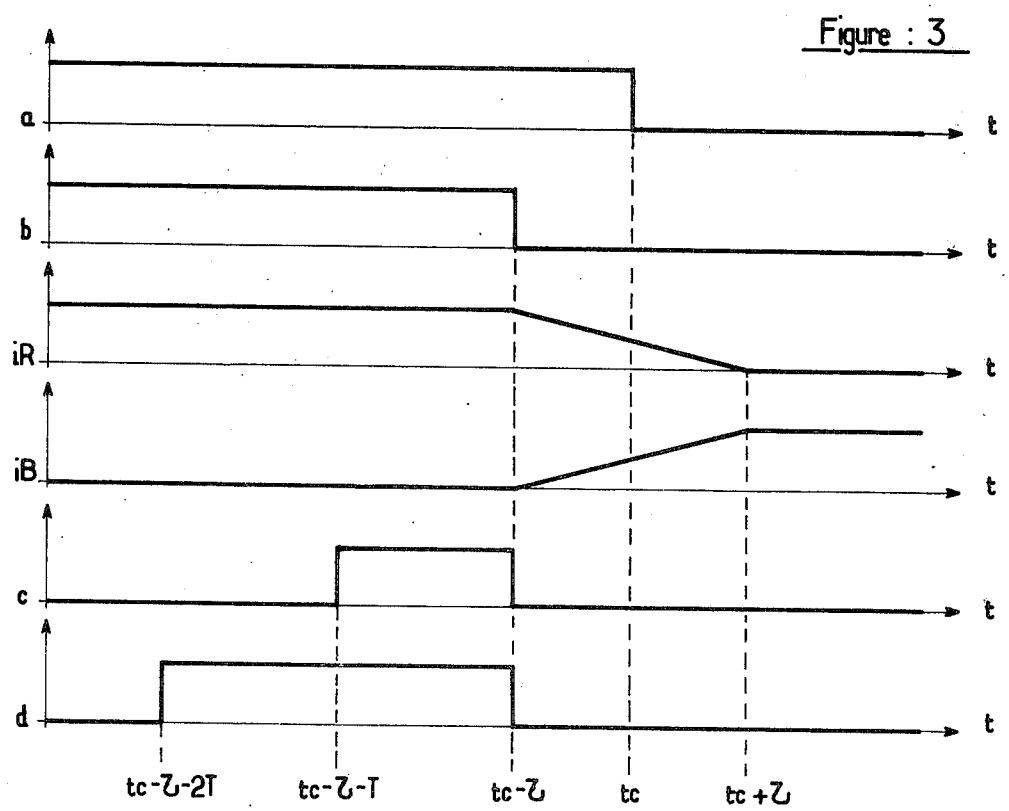
Figure: 3

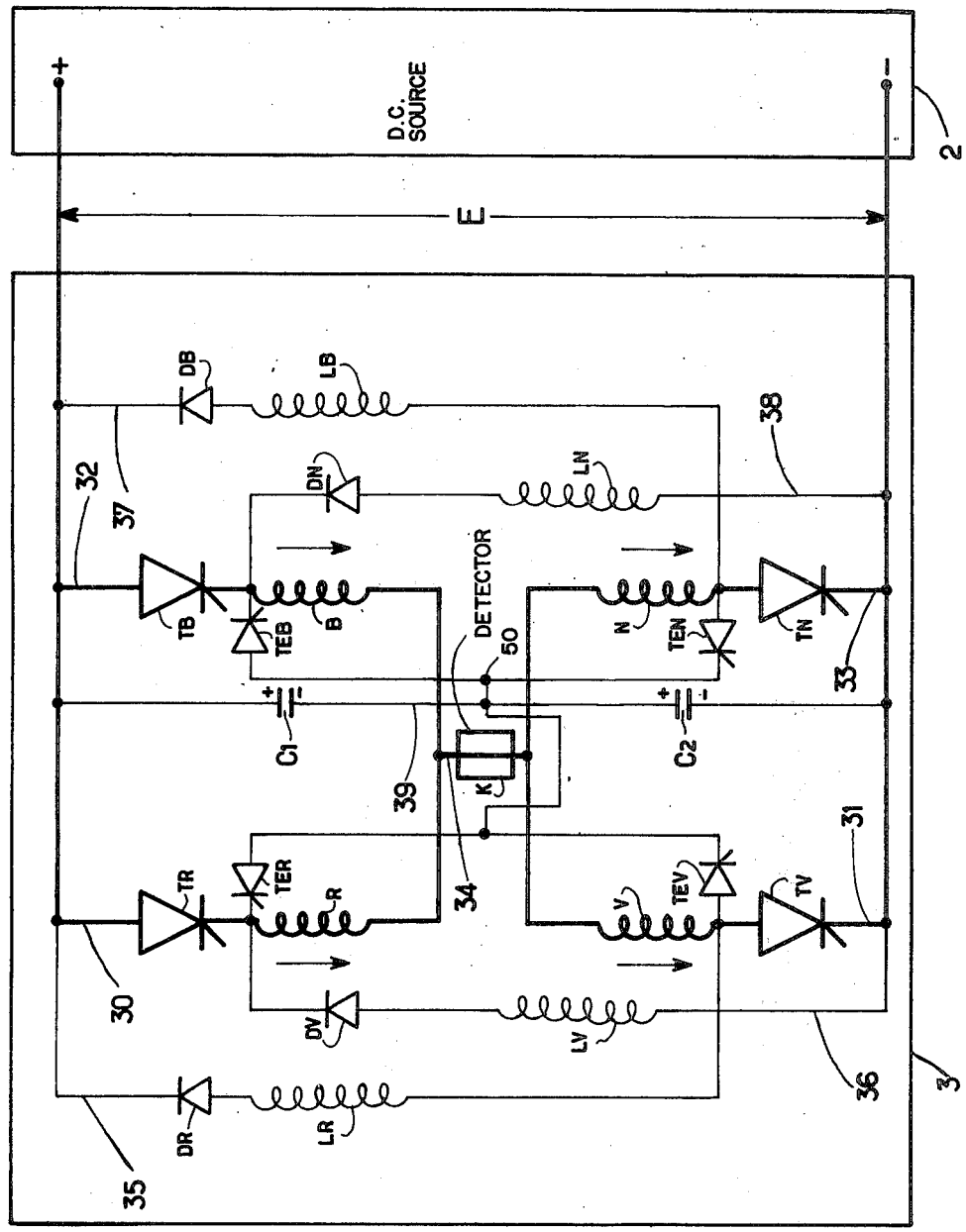
Figure: 2

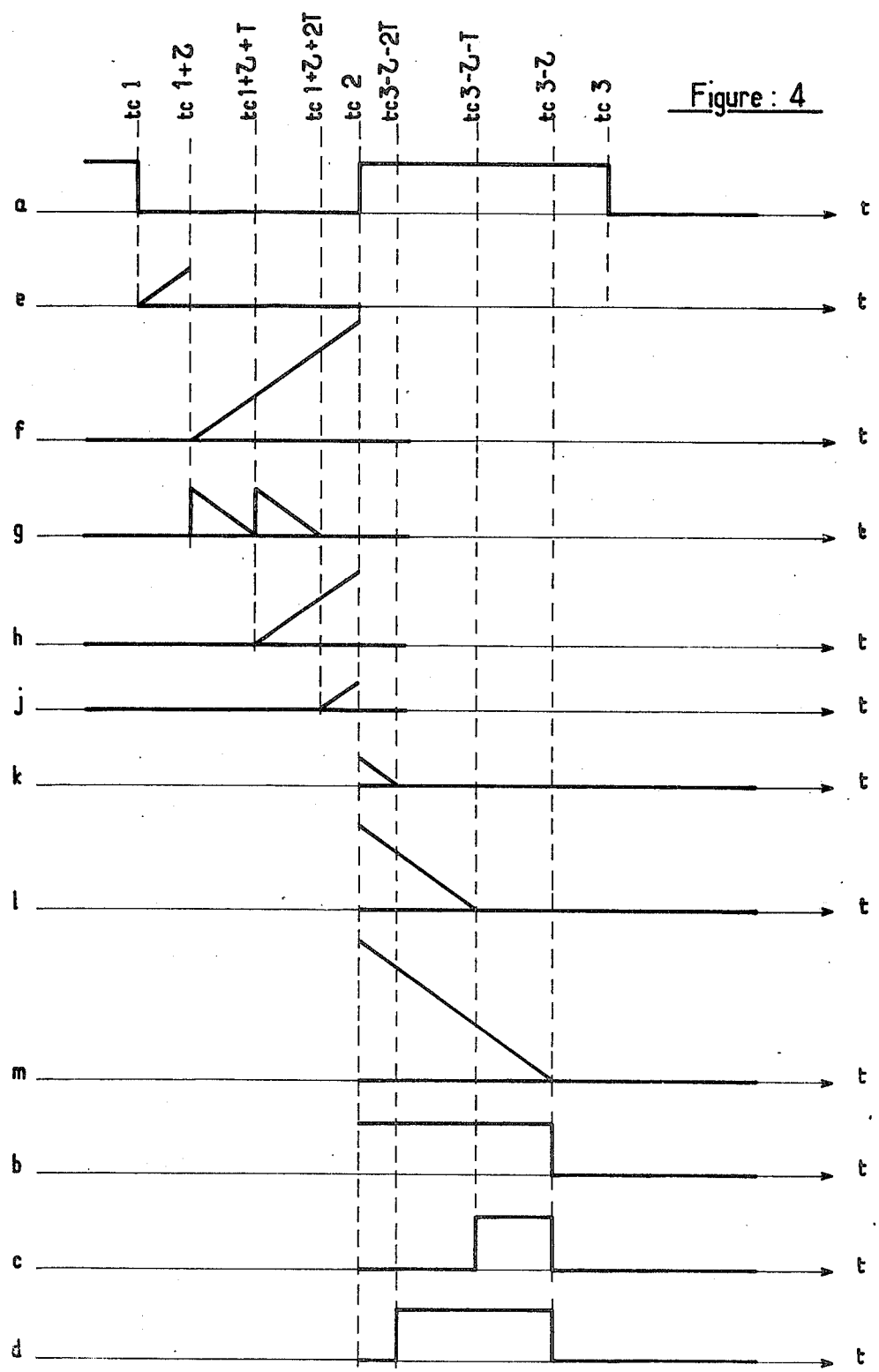

CONTROL FOR VARIABLE RELUCTANCE MOTORS

The invention relates to a control for a variable reluctance motor, comprising a D.C. source, a power control circuit and a command circuit.

The variable reluctance machine is currently used as a stepping motor. The present device makes it possible to use the variable reluctance motor with kinematic continuity. The control makes it possible, in fact, to obtain a continuous variation of the torque and of the speed of the motor, so that it operates as a motor and a generator.

The invention relates to a control for a variable reluctance motor, comprising a D.C. source, a power control circuit and a command circuit, characterised in that the power control circuit comprises main control switches in series with the windings of the motor to form terminal branches, the terminal branches being connected in groups of two, in series, between the two poles of the source, so that the two complementary windings are never in series, as well as free-wheel branches for closing the circuit of the windings when not more than one main control switch in a branch is closed, and a turn-off circuit for the main control switches, and in that it also comprises at least one current detector for registering the current in the windings. In addition, the control may be effected with relatively simple means.

According to one characteristic of the invention, the control switches are thyristors, for example, commutation thyristors. This results in an excellent relationship between the consumption of energy and the torque required from the motor.

According to other characteristics of the invention, the free-wheel branches each comprise a coil and a diode and are connected to one end to the junction of a main control switch and of a motor winding in a terminal branch, and on the other end to the pole of the D.C. source which is connected to the terminal branch in series with the former. The turn-off circuit preferably comprises two capacitors connected in series between the two terminals of the D.C. source, the junction of the capacitors being connected via turn-off control switches to the common points of the main control switches and the windings which form the terminal branches.

According to a characteristic of the invention, the command circuit comprises a coder supplying two logical signals each connected with a pair of complementary windings in order to indicate the sign of the back-electromotive force of each of the windings and to determine, depending on whether the machine is operating as a motor or as a generator, which winding should be energized. A reference device which delivers an analogue voltage proportional to the desired current amplitude for the motor windings is included, along with a charge reference device with which it is possible to determine the de-energizing of the turn-off circuit and the direction of a voltage surge, a variable device for preparing commutation in advance, generating the signals required for optimizing commutation, a sequencer, and a memory device for the state of the control switches.

The present invention will be described further in detail by means of the attached drawings, in which:

FIG. 1 is a block diagram of the entire arrangement;

FIG. 2 shows a schematic circuit diagram of the power control circuit and its branches with the windings of the machine;

FIGS. 3 and 4 show a certain number of signals in the control.

The purpose of the control for the motor 1 (FIG. 1) is to ensure the exchange of current between a D.C. source 2, which delivers a continuous voltage E, and the windings R, V, B, N of the machine (FIG. 2). It comprises essentially, in addition to the source 2, a power control circuit 3 and a command circuit 4 (FIG. 1).

The power control circuit 3 (FIG. 2) is designed to supply the four windings R, V, B, N with waves of current in phase with their back-electromotive force, in the form of pulses with variable amplitude and duration. The four windings, which are part of the motor 1 but are shown in FIG. 2 in the power control circuit 3 so as not to complicate the drawing, are connected in a circuit with a structure in the form of an H, comprising four terminal branches 30, 31, 32, 33 and a central branch 34. Each terminal branch is connected at one end to the D.C. source 2, the two branches 30, 32 being connected to the positive pole of the latter and the other two 31, 33 to the negative pole, and at the other end to the central branch 34. Each winding R, V, B, N is inserted in a different terminal branch, in series with one of four main control switches TR, TV, TB, TN. A current detector K is inserted in the central branch 34. Four free-wheel branches 35, 36, 37, 38 are provided, each connected at one end to one of the terminal branches, and at the other end to the pole of the D.C. source 2 to which the terminal branch is not connected. These free-wheel branches are for the purpose of allowing the electrical circuit to be closed when only a single main control switch is closed and to allow energy to be transferred to the source 2 when all the main control switches TR, TV, TB, TN are off. The turn-off circuits 39 make it possible to interrupt the current passing through the main control switches, and consequently to influence the type of operation of the motor 1, or rather of the rotating machine (as a motor or as a generator).

The back electromotive forces developed in the motor windings are two by two in the opposite direction to the path of rotation. To make the explanation clearer, two windings R and B, or V and N, of which the back electromotive forces are thus in phase opposition, will be designated "complementary", and the assembly formed by the two terminal branches of which the windings are not complementary will be called a "group of branches". The back electromotive forces of two complementary windings are squared in relation to those of the other two. The windings R, V, B, N may be supplied two by two by closing of two of the main control commutators switches, in this case the commutation thyristors TR, TV, TB, TN which are arranged in series with each of them respectively.

More precisely, each terminal branch 30-33 is connected to a pole of the D.C. source 2 by a main thyristor having its anode connected toward the + pole and the cathode toward the − pole. Each end of the central branch 34 is connected to two complementary windings. Each free-wheel branch 35, 36, 37, 38 is connected on one end to the junction of a main thyristor TV, TR, TN, TB and to a winding V, R, N, B, and on the other end to the pole of the D.C. source which is connected to the terminal branches comprising the non-complementary windings of the former. The free-wheel branches 35, 36, 37, 38 are each composed essentially of a coil LR, LV, LB, LN in series with a unidirectional device DR, DV, DB, DN such as a semi-conductor diode. The turn-off circuits 39 comprise two capacitors C1, C2 of equal capacitance, connected in series between the poles of the D.C. source 2. The common point of the two capacitors C1, C2 is connected to junction of each main thyristor TR, TV, TB, TN with a winding R, V, B, N of the motor 1, via four respective control switches TER, TEV, TEB, TEN such as commutation thyristors, which we shall call turn-off thyristors throughout the rest of the description. The control circuits of the switches, that is, in this instance the circuits of the thyristor gates, are not shown in FIG. 2 and form part of the command circuit 4 (FIG. 1).

The detector K arranged in the central branch 34 provides a continuous measurement of the current which circulates in the two active windings, whichever these may be.

The power control circuit 3 can operate in various ways, according to the direction of the energy exchanges and the components set in motion by these exchanges. It is obvious that the D.C. source 2 can supply energy to the windings R, V, B, N of the motor via the main thyristors, if these are controlled in an appropriate way. It is equally obvious that energy may be transferred from the motor windings to the source via the free-wheel branches 35, 36, 37, 38 when the main thyristors are off. The exchanges of energy between the turn-off capacitors C1, C2 and on one hand the D.C. source and on the other hand the windgings are more complex. As these exchanges must be taken into consideration in the explanation of the ways in which the motor operates, and consequently of the types of commutation of the device, it is necessary to describe them in greater detail.

If the turning-off process of the main thyristor TR is considered, the operation of the turning-off circuit 39 comprises three phases:

maintaining an inverse voltage at the terminals of the main de-energizing thyristor TR. Initially greater than the supply voltage E, the potential of the common point 50 decreases until it is equal to this voltage, decrease of the potential of the common point 50 of the two capacitors C1, C2 to a nil value, production of the voltage surge, inverse this time, which is necessary for the subsequent turning-off, in this case that of the main thyristor TV. During this last phase the voltage to the terminals of the diode DV of the free-wheel branch 35 is inverted and a current is therefore established in this branch.

The necessary voltage surge for turning off the main thyristors, generated at the common point 50 of the turning-off capacitors C1 and C2, is of course dependent on the capacitors condensers, the inductance of the windings R, V, B, N of the motor, and the resistance of the circuit (the charge should assume an oscillating behaviour and should be cut off before decreasing below the value of the supply voltage E). Here the de-energizing of the turning-off thyristor TER is carried out while the current in the free-wheel branch 36 is equal to the current which is passing through the windings R, V. The voltage surge obtained is thus also linked to the value of the free-wheel inductance LV.

It should be noted that the charge obtained after turning off a "high" main thyristor TR, TB only allows the turning off of a "low" main thyristor TV, TN.

In order to simplify the description of the operating process, this will only cover one elementary sequence, it being understood that the operation of the D.C. source 2 involves a series of these elementary sequences. One elementary operating sequence is defined as being the period of time between two commutations. A "commutation" is used to designate the exchange of current between two complementary windings; this phase begins in this instance when, the main thyristor TR which supplies a first winding R having previously been turned off, the thyristor TB supplying the complementary winding B is turned on; it ends with the disappearance of the current into the first winding R. The commutations and consequently also the elementary sequences are in principle triggered off by the changes in the condition of the signals issued by a coder which is part of the command circuit 4. An elementary sequence thus corresponds to the passage of the current through two of the four windings, and it comprises a commutation switching on and a turning-off intended to prepare for the following commutation.

Besides its specific role defined above, the commutation makes it possible to adjust the current at the start of each elementary sequence; in order to arrive at this result, several types of commutation are defined, according to the components between which the transfer of energy is effected, the direction of the transference and the amount of energy to be transferred.

More precisely, as it has been seen, each elementary sequence comprises a switching on and a turning off, so that the three possible types of commutation listed below are obtained by shifting the turning off in relation to the switching on:

commutation of the first type: turning off takes place after switching on and two thyristors which are not complementary therefore conduct at the same time. The transfer of energy takes place from the D.C. source 2 toward the motor 1, then from the turn-off capacitors C1, C2 toward the motor. The final current depends on the amount of conduction determined by the time separating the turning off from the switching on.

commutation of the second type: the turning off is synchronous with the switching on. All the energy passes through the capacitors C1, C2.

commutation of the third type: turning off precedes switching on. A first phase corresponds to a transfer of energy from the motor to the capacitors until the de-energizing of the turn-off thyristor.

There then appears a phase when energy is returned to the source 2 via the free-wheel circuits 35-38. This second phase can be omitted if turning on takes place before the de-energizing of the turn-off thyristor.

By appropriate choice of the type of commutation it is possible always to adjust the current to a command value at the start of each elementary sequence. This possibility is one the essential bases of the control.

The choice of the type of commutation is therefore linked to the initial value of the current (lower or higher than the command value); it also takes into account the preceding events.

A commutation of the first type is used to increase the current to the command value, and turning off is effected when this value is reached. The second type may be considered as a definitive case of the first instance, and determines the minimum quantity of energy which can be transmitted to the machine during an elementary sequence; if the energy effectively consumed during the course of this same sequence is less, an imbalance arises which must be compensated for. The commutation of the third type makes it possible to initiate an elementary sequence which adjusts the current down by returning energy towards the capacitors C1, C2 and the source 2.

One of the tasks of the control device is therefore to determine the type of commutation to be carried out in relation to the level of the current on one hand, and on the other hand, the nature of the preceding commutation. The conditions imposed with regard to the type of commutation are given in the following Table:

| Preceding commutation | Current Registered Control current | Commutation to be carried out |
|---|---|---|
| 1st type | <1 | 1st type |
|  | >1 | 2nd type |
| 2nd type | <1 | 1st type |
|  | >1 | 3rd type |
| 3rd type | <1 | 2nd type |
|  | >1 | 3rd type |

It has been shown that there are in particular two states to be considered:

two main control thyristors TR, TV are conductive, and the motor receives a greater quantity of energy from the source 2 than that which is converted, and the current is increasing, as one of the two main thyristors is turned off, for example TR, the electrical circuit, being on free-wheel, receives no energy from the source 2, and the current converted energy corresponds to a decrease in the current.

The regulation of the cyclic relationship of these two states, based on the measurement of the amplitude of the current at the time, makes permanent control possible. If the necessity arises for maintaining the current, the turned-off main thyristor TR can be re-energized and at the end of this operation it is necessary, to prepare for the following commutation:

to turn off the other main control thyristor TV to invert the charge of the capacitors C1, C2, to switch on this main thyristor TV again when the charge is achieved and to turn off the first main thyristor TR which has been re-energised, to prepare for the commutation. In effect, whatever operations are carried out, before each commutation the state must obtain where two windings are energized by a current, one of the two main thyristors being the conductor and the other being blocked, the closing of the circuit then being effected by a free-wheel branch, in this instance the branch 36. The blocked main thyristor is that which should normally be replaced during the subsequent commutation. It will be noted in particular that in the case where the preceding commutation has involved a "high" winding, the following commutation must of necessity involve the "low" windings; to do this, the "low" main thyristors must be blocked, and the capacitors must be charged to turn off the "high" main thyristors. The process is exactly the reverse when the preceding commutation has involved a "low" winding.

The turning off of a main control thyristor is carried out by the energizing of the discharge circuit of one capacitor, and since the natural de-energizing of this circuit occurs after a certain time when the other turn-off capacitor is recharged, it is necessary to prevent any premature re-energizing of the same main thyristor which would interrupt this charge, no matter what information is supplied by the current detector K. This is the specific role of a charge reference device provided in the control device 4; to make it possible to defer re-energising, if required, while the turning-off circuit is active. Further, this charge reference device supplies the basic information which makes it possible to determine which may be turned off, in relation to the respective charges of the condensers.

Any turning off following a turning off prior to an established commutation must involve the main thyristor which must be turned off to allow the next commutation, whether this turning off is effected before, during or after the energizing relative to the commutation. Not until this turning off has been achieved and the capacitors recharged is the system ready to commutate again. When the system is ready to commutate, the maintaining of the current must be abandoned if the time remaining before the next commutation is less than two times the duration of the turning off period, since, as indicated above, any switching on of a main thyristor intended to increase the current involves the turning off of the other main thyristor of the group to invert the charge of the capacitors to prepare for the following commutation, then the switching on of the said other main thyristor again when the charge is attained and the switching off of the first main thyristor to prepare for the commutation. As a result, the commutation must be anticipated, and a period equal to double the duration of a turning off is reserved to prepare for it. During this preparation phase, any re-energizing of the main thyristor to be commutated is therefore prohibited. If the main thyristor is conducting, two cases may arise:

If the capacitors are charged to switch it off, the switching off will be triggered at the latest after a period of time equal to the duration of a turning off period, in the opposite case, the turning off of the other main thyristor is triggered instantly in order to invert the charge, and then the preceding case is arrived at.

The preparatory phase for the commutation is therefore conditioned for the worst case, that is, that in which two turn-off operations are necessary before commutation; during all of this period, the prohibited operations and the obligatory operations are determined by the time, the conduction conditions and the charge of the capacitors. This means that the commutation must be anticipated, which is not always possible. In this case, it may be necessary to carry out all or part of the above operations not in advance but retrospectively, the principle always remaining identical and the opérations being linked together in order to enable them to be completed as soon as possible. The maximum delay arises when a first winding must be commutated and the corresponding main control thyristor and the other main control thyristor of the same group are conducting, the capacitors being charged to switch off the latter. In this case, it is this one which should be switched off; then after the discharge of the capacitors, it should be switched on again and the main thyristor corresponding to the winding to be commutated must be switched off, the thyristor of the winding replacing it being switched on only after a new charging period of the capacitors.

As a result of these requirements the operation of the supply device depends on a certain number of variable conditions. These variables are:

S1 and S2; signals issued directly from the coder
I: output from the current detector
U: command voltage
tfL and tf2: outputs from the charge reference device.

The states of the turn-off capacitors C1 and C2 are described by four logical signals:

φRB indicates a voltage with a mean point higher than the supply voltage, that is, the possibility of de-energising the thyristors TR or TB, φVN indicates a voltage lower than zero, allowing the de-energizing of TV or TN, EI1 indicates the action of the turning-off thyristors TEB or TER, i.e., the phase lying between the de-energizing of TB or TR and the end of charging of the capacitors.

EI2 indicates the corresponding action of the thyristors TEV or TEN.

Further, the current I is compared continuously with the voltage U and as a result a logical variable LC (current limit) is obtained, indicating if the current is higher than the command value.

The purpose of the command circuit 4 is to produce signals corresponding to the condition variables and to process them, having regard to the conditions in the control circuit 3. For this purpose, it comprises a certain number of devices listed below: A position coder supplies two logical signals S1 and S2, each connected to a pair of complementary windings in order to indicate in every case the sign of the back electromotive force of each of the motor windings and to determine, according to whether the motor is operating as a motor or as a generator, which windings should be energized. A reference device develops an analogue voltage proportional to the desired current amplitude for the motor windings in order to supply the motor so that the current measured by detector K follows this command voltage faithfully. A charge reference device makes it possible to determine, after a turn-off operation, a full attaining on the charge of the capacitors C1, C2, i.e. the de-energizing of the turning-off circuit and the direction of the voltage surge obtained. A variable device for the advance preparation for commutation amalgamates all of the processing information and, from the coder signals and from the measurement of the period for charging the capacitors, makes it possible to generate the signals required to optimize commutation. From the advance signals supplied by the variable device for preparing for commutation and from the direction of rotation commanded, a sequencer produces the necessary information for energizing the motor windings. A memory device for the condition of the thyristors used as control switches makes it possible to register the condition of each of the main thyristors and each of the turn-off thyristors. Bearing in mind the fact that the thyristors and the memories correspond, it is expedient to use the same designation for the memories as for the corresponding thyristors, in order not to complicate the description. Thus, these memories may be designated TB, TR, TV, TN, TEB, TER, TEV, TEN.

The reference device comprises in particular a comparator intended to compare continuously the command voltage U proportional to the desired intensity and the signal I representative of actual current, to develop the logical variable LC indicating the sign and the difference.

In the charge registering device, detection transformers supply a continuous signal during the conduction of the turning-off circuit, giving broadly the following characteristics:

the signal is negative as long as the voltage at the central point 50 lies between zero and the supply voltage;

the signal suddenly becomes positive as soon as the central point 50 shows a voltage surge, then cancels with the de-energizing of the turning-off circuit.

The positive impulse given in the form (tf), indicates that the turning-off operation has terminated normally in an opposite voltage surge, allowing the following turning-off. In order to eliminate any parasitic information, means are provided to create a window which can be opened at the end of the switching on impulse of the turning-off thyristor and which is closed by the impulse, tf, only the first impulse thus being taken into account. A bi-stable trigger circuit records the direction of the voltage surge; the impulse tf1 originating from the turning-off circuit formed by the turning-off thyristors TEB, TER indicates condition φVN; the impulse tf2, originating from the turning-off circuit formed by the turning-off thyristors TEV, TEN indicates condition φRB.

FIG. 3 (where the time is given on the abscissa) shows how the variable device for preparing for commutation in advance makes it possible to compensate for the non-immediate nature of the commutation. In effect, the current in a winding, for example the current iR in the winding R, does not change immediately with the current in another winding, for example iB; however, it has been shown that this fact does not cause a problem if the start of the commutation is advanced, so that this operation can be centred on the theoretical moment tc. The signals (a) from the coder must thus be advanced by a time $\tau$ proportional to the intensity of the current; in triggering the commutation by the signals (b) advanced in this way, it is possible to satisfy the previous principles. Since the commutation must be given an advance corresponding to two charging periods for the condensers, a memory store for the charge period stores the duration T of the last charging period measured. From this information two signals (c) and (d) are generated, associated with each of the channels of the coder, corresponding to an estimate of T and 2T. Thus, three signals are associated with each channel; one advanced signal (b) and two provisional signals (c) and (d), shown in FIG. 3. To produce these signals the following is taken into account:

the variation of the duration of the elementary sequence is insignificant during a complete commutation cycle (successive supply of the four windings), the variation in the turning-off period is insignificant from one turning off to the next, since it only depends on the current, the variation rate of which is relatively limited.

Thus, with each channel of the coder there are associated, in a variable device for the advance preparation for commutation, three registers and substractors. The registers are loaded with a clock frequency and their entry can be inhibited. There is also a ramp generator with a variable threshold which allows a time to be subtracted. After each turning-off process the total period is measured by a register and put into the memory.

In the description of the operating sequence which follows, with reference to FIG. 4 where the time is given on the abscissa, the name of the different components is followed in parenthesis by the symbol of the corresponding output signal. Each transition tc1, tc2, tc3, of the signal (a) corresponding to a channel of the coder causes the triggering of the ramp generator (e). When the threshold is reached at the end of a time $\tau$, the inhibition of the first register (f) is lifted, and it stores information proportional to the time which has elapsed. Simultaneously, a subtractor (g) is loaded with the value of the switching off period and continuously subtracts. When it reaches zero, it is re-loaded and the inhibiting of the second register (h) is lifted. When zero is reached for the second time, the inhibition of the third register (j) is lifted. At the next transition, the three subtractors (m), (l), (k) are loaded with the contents of the three registers (f), (h), (j) and subtract immediately. When the first subtractor (m) reaches zero a signal (b) is generated in advance relative to the signal from the coder; when the second subtractor (l) reaches zero a signal (c) is generated preceding the advance signal (b) by a turning-off period; when the third subtractor (k) reaches zero a signal (d) is generated, preceding the advance signal (b) by two turning-off periods.

The sequencer comprises four commutation memories and four condition memories. These memories indicate, at a given moment and taking into account the direction of rotation commanded, the two active windings and the requirements for commutating two windings, each condition of each channel of the coder corresponding to a winding for one given direction of rotation. The requests for commutation are registered until they are carried out, making possible by comparison with other information describing the state of the system, the linking of the operations terminating in effective commutation.

To explain the operation of the sequencer, we will only consider in the following the advance signals S and S' which alone are used. The direction of rotation commanded is represented by the logical variable "s".

As indicated above, a pair of windings is affected with each of the signals. For a given direction of rotation, the energization of one or another of the windings is linked with the condition of the signal, the relationship being inverted for the other direction of rotation.

A relationship can thus be chosen:

$$B = S \oplus S$$

$$R = \overline{B}$$

$$V = S \oplus s$$

$$N = \overline{V}$$

Under these conditions, each change in the condition of the signals S and S' calls for a commutation, thus the energizing of a thyristor. The thyristor involved is determined by the leading edge of the signal, either rising or falling, of the coding signal, and the value of "s".

The request for commutation is put into the memory until it is put into effect, i.e. until the effective energising of the thyristor, the four memories being designated TCB, TCR, TCV, TCN. These designations are chosen in such a way that, for example, TCB indicates a request for commutation from the winding R to the winding B by energising the thyristor TB.

When the commutation is completed, a second memory retains the condition of the active winding. These four condition memories are designated R, B, V, N like the corresponding windings.

The inversion of the direction of rotation is subject to particular precautions: this inversion changes instantly, channel by channel, the condition memories R and B on one hand and V and N on the other hand. If it occurs during a request for commutation, it will have no effect until the commutation has been completed. The condition then loaded corresponds to the new value of "s".

The opération of the command device is thus controlled by a certain number of operations and logical equations.

Corresponding to the limitation of the current, there is a function combining two analogue signals: the command voltage and the current measured at the central point of the motor, forming a logical signal LC with the following significance:

LC = 1 if the current is greater than the command,
LC = 0 in the opposite case.

A signal designated RF is linked to each channel:
RF1 goes to 1 after a transition to S' with LC
RF1 goes to 0 after transition to S with $\overline{LC}$
RF2 goes to 1 after a transition to S with LC
RF2 goes to 0 after a transition to S' with $\overline{LC}$ Broadly speaking, if RF1 and RF2 are at zero when a commutation occurs, this will be of the first type, if one of the two is at zero and the other at 1 it will be of the second type, and if the two are at 1 it will be of the third type.

In relation to the different variable conditions produced by the proceding operations, signals are generated for switching on the main thyristors TR, TN, TB, TV, or for turning them off; the latter are signals for energising the turn-off thyristors TER, TEN, TEN, TEB, TEV. The signals for energising the main thyristors are designated respectively according to the main thyristor to which they relate, RAB, RAR, RAV, RAN; the signals for turning off the main thyristors (the signals for energising the turning-off thyristors) are designated REB, RER, REV, REN. Each of these signals is a gate impulse applied to the corresponding thyristor and also supplied to the corresponding memory for the conduction condition, in the memories designated respectively TB, TR, TV, TN, TEB, TER, TEV, TEN.

With the aim of simplifying the analysis leading to the logical equation which expresses the signals for switching on a given thyristor, an artifical distinction is made between switching on a commutation and switching on the maintaining process. The first is called for by a change in the state of a coder signal, the second by the passing of LC to zero. There is a third marginal type, which is the re-positioning switching, when a thyristor has been turned off to invert the charge of the condensers. It is then systematically switched on again at the end of this charging.

It should be remembered that a thyristor should never be energised if the complementary thyristor or a turning-off thyristor of the same channel is conducting; thus, for example, the thyristor TB should never be energized if TR, TEB or TER are conducting.

According to the type of commutation, switching on is carried out instantaneously or deferred until LC reaches zero. Thus, the commutation memory TCB of the sequencer, for example, supplies a signal to switch on the thyristor TB if RF1 is at zero or if LC is at zero.

As a general rule, switching on for maintaining is triggered by LC going to zero. It is prevented when the commutation of the thyristor involved is anticipated less than two turning-off periods later. It is also prevented if the preceding commutation has been of the third type, thus if:

$$IH = RF1 \cdot RF2 = 1$$

Re-positioning switching is commanded when all the thyristors are turned off (TTE) as long as a commutation of the third type ($\overline{IH}$) is not involved.

If, the addition, there should be an order to start up, (OD), it is possible to explain the logical equation of the switching on signals, for example RAB.

$$RAB = OD.\overline{TR}.\overline{EII} [TCB. (RF1 + LC) + \phi VN. B.$$
$$\overline{IH} (TTE + \overline{LC.TTI}) ].$$

Signals for turning off only appear if the thyristor is conducting and if the capacitors C1 and C2 are charged in the direction which allows it to be de-energized. They are generated in the following cases:

if LC = 1, whilst another thyristor is conducting, at the start of a commutation of the 2nd or 3rd type (presence of RF1 after a transition to S' (TCS') or of RF2 after a transition to S (TCS), to prepare for commutation with and advance of one turning-off period (indicated by the presence of a logical variable ΘE linked to each channel), when two thyristors are conducting and the commutation of one of them is anticipated less than two turning-off periods hence, the other having to be turned off to invert the charge if this is not correct, in the absence of an estimation, when one winding is to be commutated and the thyristor which supplies it is conducting; two instances may thus arise: either this thyristor may be turned off immediately, or it is necessary to invert the charge of the condensers in advance; the distinction between these two cases is supplied by the condition of $\phi$. In the two cases only the authorised thyristor will be turned off.

The operation of this control, despite its apparent complexity, may be achieved by making use of a minimum of means, whilst retaining optimum operation.

Naturally, the invention is not limited to the construction example shown and described above, based on which other types and other forms of construction could be envisaged without exceeding the scope of the invention.

I claim:

1. In a control for a variable reluctance motor energized from a D.C. source, including a power control circuit actuated by a command circuit, in which the power control circuit comprises a plurality of solid-state main control switches each connected in series with one winding of the motor to form a corresponding plurality of terminal branches, one end of half of the terminal branches being connected to each pole of the D.C. source and the other ends of all of the terminal branches being connected to each other by a central branch, the command circuit actuating the main control switches to energize the windings in predetermined sequence, the improvement comprising:
a corresponding plurality of free-wheel branches for supplying energy from the motor to the D.C. source whenever no more than one main control switch is closed, each free wheel branch comprising a coil and a diode connected in series between the junction of the main control switch and the winding in one terminal branch and the pole of the D.C. source to which that terminal branch is not connected.

2. A control for a variable reluctance motor according to claim 1, in which the diodes in the free-wheel branches are each polarized to oppose flow of current through the associated main control switch in the direction of normal energization for the associated winding.

3. A control for a variable reluctance motor according to claim 1 in which each control switch is a thyristor.

4. A control for a variable reluctance motor according to claim 1, and further comprising:
a turn-off circuit including two capacitors connected in series across the two poles of the D.C. source, the junction of the two capacitors being connected to a corresponding plurality of solid-state turn-off control switches actuated by the command circuit, each turn-off control switch being connected to one terminal branch at the junction of the main control switch and the winding.

5. A control for a variable reluctance motor, according to claim 4, in which the power control circuit includes a detector for detecting the amplitude of current in the central branch, connected to the command circuit.

6. A control for a variable reluctance motor, according to claim 5 in which the command circuit comprises:
a coder supplying two logical signals each connected with a pair of complementary windings to indicate the sign of the back electromotive force of each of the windings and to determine, depending on whether the motor is operating as a motor or as a generator, which windings should be energized;
a reference device supplying an analog voltage proportional to the desired current amplitude for the motor windings;
a charge registering device making it possible to determine, after the opening of a control switch, the de-energizing of the turn-off circuit and the direction of a voltage surge;
a variable device for advance preparation for commutation, to generate the signals necessary for optimization of the commutation;
a sequencer; and
a condition memory for registering the operating conditions of the control switches.

7. A control for a variable reluctance motor, according to claim 6, in which the charge registering device comprises detection transformers for producing at least one charge registering signal, means for creating a window for eliminating parasitic signals, and a bi-stable trigger circuit for registering the direction of a voltage surge.

8. A control for a variable reluctance motor, according to claim 6, in which the variable device for advance preparation for commutation comprises a memory store for registering the duration of the charging of a capacitor in the turn-off circuit, a ramp generator with a variable threshold, and three registers and three subtractors per channel.

9. A control for a variable reluctance motor, according to claim 6, in which the sequencer comprises four commutation memories and four condition memories for recording, respectively, the requests for commutation and the condition of the windings.

* * * * *